United States Patent [19]

Briggs

[11] 4,058,203

[45] Nov. 15, 1977

[54] BULK MATERIAL DISLODGING AND GATHERING APPARATUS

[75] Inventor: Aubrey C. Briggs, Carnegie, Pa.

[73] Assignee: Dravo Corporation, Pittsburgh, Pa.

[21] Appl. No.: 701,898

[22] Filed: July 1, 1976

[51] Int. Cl.² ............................................. B65G 65/22
[52] U.S. Cl. .................................. 198/509; 198/513; 198/703; 214/15 R
[58] Field of Search ............................. 198/509–513, 198/518, 519, 592, 703, 632; 214/14, 15 R; 299/67, 75

[56] References Cited

U.S. PATENT DOCUMENTS

| 938,361 | 10/1909 | Adkins | 198/518 |
|---|---|---|---|
| 1,445,087 | 2/1923 | Joy | 198/510 |
| 2,037,959 | 4/1936 | Bean | 198/512 |
| 2,773,608 | 12/1956 | Hunt et al. | 198/519 |
| 2,877,882 | 3/1959 | Fitzgerald | 198/513 |
| 2,885,054 | 5/1959 | Sibley et al. | 198/513 |
| 3,088,718 | 5/1963 | Lilly | 198/518 |
| 3,297,148 | 1/1967 | Andrews | 198/513 |
| 3,595,405 | 7/1971 | Van Kleunen | 214/14 |
| 3,847,270 | 11/1974 | Briggs | 198/709 |

FOREIGN PATENT DOCUMENTS

| 236,221 | 10/1925 | United Kingdom | 198/518 |
|---|---|---|---|

Primary Examiner—John J. Love
Assistant Examiner—Jeffrey V. Nase
Attorney, Agent, or Firm—Parmelee, Miller, Welsh & Kratz

[57] ABSTRACT

A pair of screw conveyors pivotally mounted on rotatable arms extending laterally from the extended ends of the bottom sprocket wheel shaft on a bucket ladder dislodge bulk material and direct it toward the buckets. The bottom sprocket wheels are journaled for rotation independent of the shaft which is rotated by a centrally located drive mechanism to position the rotatable arms and therefore the screw conveyors for various operations.

6 Claims, 8 Drawing Figures

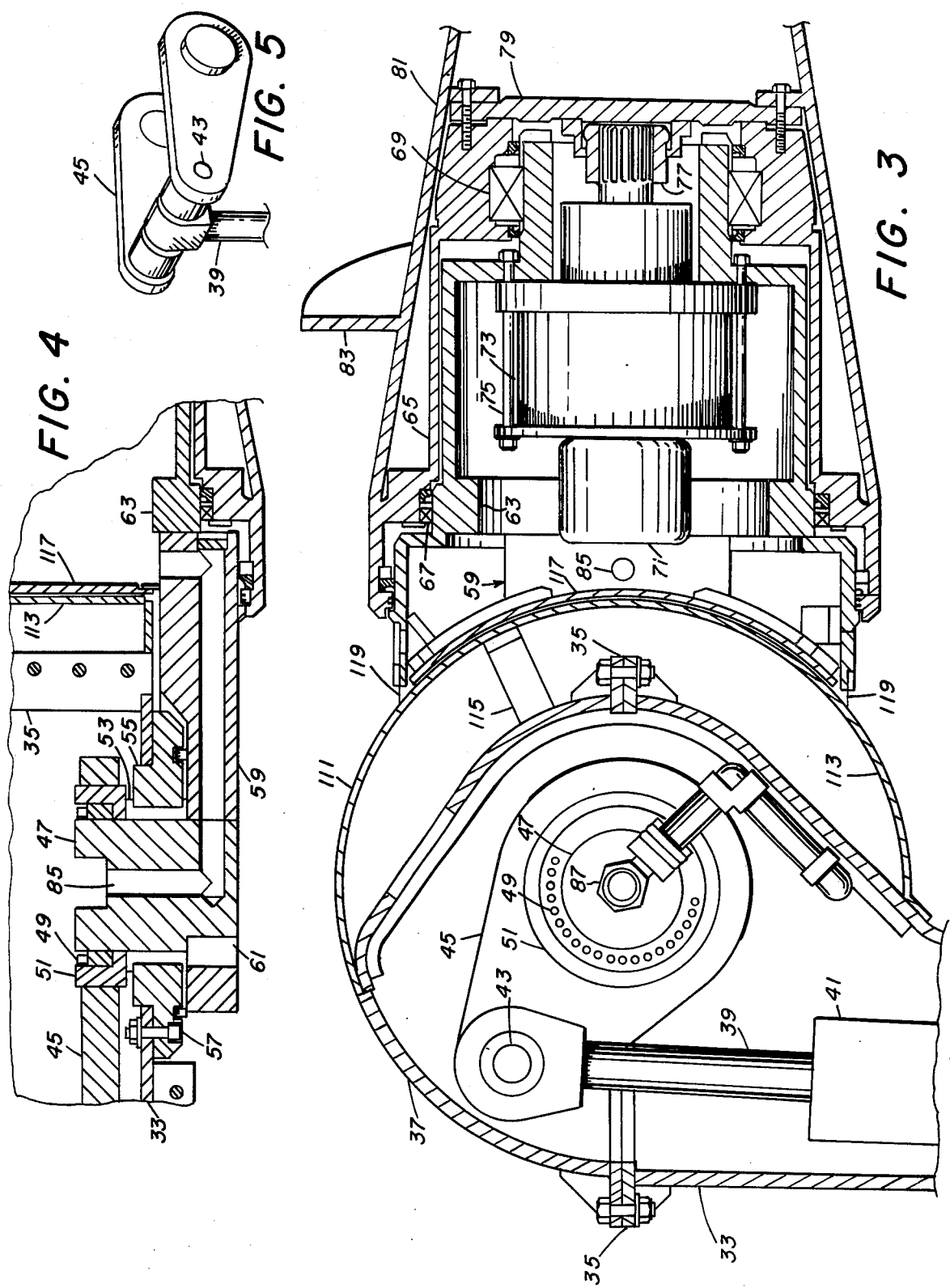

BULK MATERIAL DISLODGING AND GATHERING APPARATUS

BACKGROUND OF THE INVENTION

1. Field of the Invention

This invention relates to transporters for vertically raising bulk material and more particularly to apparatus mounted on the transporter for dislodging bulk material and drawing it toward the transporter.

2. Prior Art

As bulk cargo ships have grown larger, continuous type unloaders, such as bucket ladders, have been increasingly employed to raise the bulk material from the ships' holds. An example of such an unloader is disclosed in U.S. Pat. No. 3,847,270. Belt conveyors have also been employed to remove bulk material from smaller vessels such as barges.

Various devices have been proposed for drawing material toward the vertical transporter. U.S. Pat. Nos. 3,595,405 and 3,823,915 disclose the use of a bucket wheel to load bulk material from a vessel onto a belt conveyor and a bucket ladder respectively. The first of these patents also discloses the use of a backhoe device to draw material toward the bucket wheel. U.S. Pat. No. 2,773,608 suggests a somewhat similar type of device for drawing material toward a conveyor in the form of fingers mounted eccentrically on rotating discs placed in front of the conveyor. It has also been proposed in U.S. Pat. No. 3,770,145 to use movable plows to direct material toward a barge unloader.

One of the drawbacks of the prior art devices is that they lack maneuverability and therefore have a limited capability of dislodging material and gathering it inward from all around the transporter. This is a significant shortcoming in unloading bulk material through a hatch where material under the deck and in the corners must be drawn to the transporter for efficient unloading. The prior art devices are also generally bulky which is a limiting factor in adapting them for unloading ships through a hatch. A primary object of the present invention is to provide a bulk material dislodging and gathering device which is highly maneuverable such that it can dislodge and gather bulk material from all around the transporter especially under the deck of a ship and in the corners of a hold, yet is compact enough that it can be inserted and withdrawn through restricted hatch openings.

SUMMARY OF THE INVENTION

According to the invention, apparatus for dislodging and drawing bulk material toward a depending elongated bulk material transporter having lifing means which rotates in a closed loop to raise the bulk material from the lower end of the transporter to the upper end thereof includes: a first elongated member extending laterally out of the plane of the lower end of said loop formed by the lifting means, a second elongated member extending laterally from the extended end of said first elongated member and rotatable about the longitudinal axis of the first elongated member and dislodging and gathering means connected near the free end of the second elongated member and extendable laterally therefrom for dislodging and drawing bulk material toward the lifting means.

Preferably, the dislodging and gatering means is a screw conveyor pivotally connected to the second elongated member for movement in a plane containing the longitudinal axes of both the first and second elongated members. Thus, with the first elongated member extending outward perpendicular to the plane of the loop of the transporter and with the second elongated member rotated into alignment with the transporter loop, the screw conveyor can be stowed along side the transporter by pivoting the screw conveyor until its longitudinal axis is parallel to the side of the transporter. In this configuration a transporter equipped with the dislodging and gathering means of the invention presents a slim cross section which facilitates entry and withdrawal of the transporter into and from a ship's hold.

In the preferred embodiment, the second elongated member is fixed to the first elongated member and is revolved by rotation of the first elongated member. Where the transporter is a bucket ladder having buckets mounted on a continuous chain guided around the lower end of the loop by a sprocket wheel, the sprocket wheel is concentrically mounted with the first elongated member but journaled for independent rotation. In the embodiment of the invention disclosed, the bucket ladder includes a pair of continuous chains and a pair of sprocket wheels for guiding the chains around the lower end of the loop and the first elongated member extends out of both sides of the loop made by the chains and is concentrically mounted with both sprocket wheels. In this configuration, second elongated members extend laterally outward from each extended end of the first elongated member and a screw conveyor is laterally extendable from each second elongated member.

With the second elongated members revolvable about the longitudinal axis of the first elongated member and with the screw conveyors pivotably mounted on the ends of the second elongated members, the device has a great deal of flexibility and may be variously maneuvered to perform many operations including digging while the transporter is moving across the hold of the ship and for cleaning up the front, sides and rear of the hold. In addition, the apparatus is rugged and, as mentioned above, may be stowed flat against the sides of the transporter for passage through the deck opening.

BRIEF DESCRIPTION OF THE DRAWINGS

FIG. 3 is a vertical section view through a portion of the dislodging and gathering apparatus illustrating the mechanism for pivoting the screw conveyor and rotating the screw conveyor flights;

FIG. 4 is a partial horizontal section view through a portion of the dislodging and gathering apparatus illustrating the arrangement for providing service lines to the screw conveyor;

FIG. 5 is a simplified perspective view illustrating part of the mechanism for pivoting the screw conveyor;

DESCRIPTION OF THE PREFERRED EMBODIMENT

Figure 1:
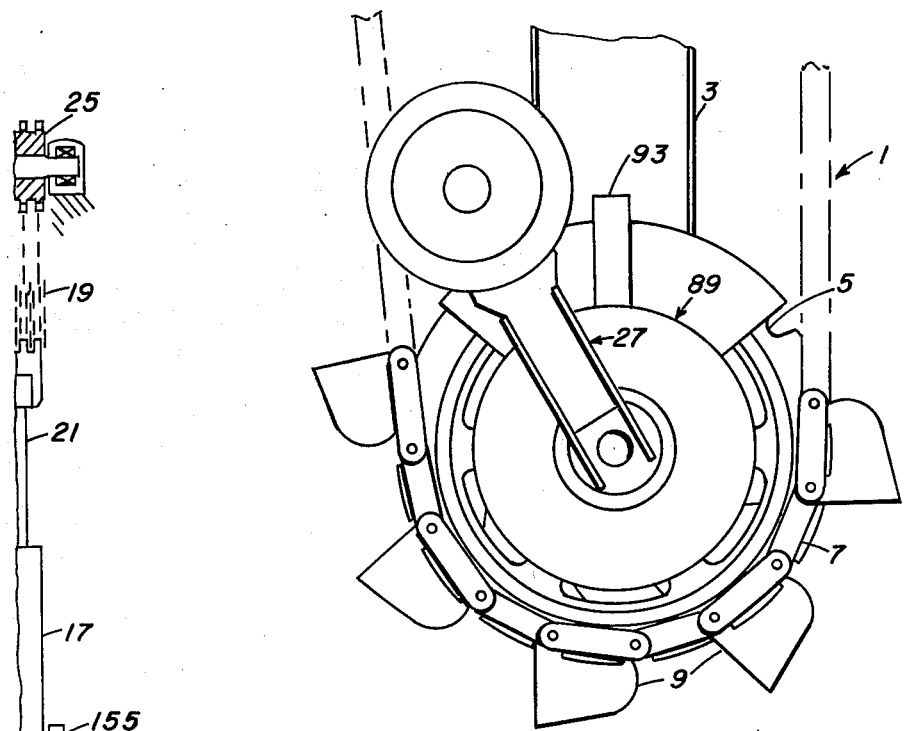
FIG. 1 is a side elevation view of the lower portion of a bucket ladder incorporating bulk material dislodging and gathering apparatus according to the invention.

FIG. 1 illustrates the lower portion of a vertical transporter such as a bucket ladder 1 of the type disclosed in U.S. Pat. No. 3,847,270 (hereafter "the patent"), which is hereby incorporated by reference into this application for the purpose of disclosing a complete unloader. The bucket ladder includes a box frame 3 supporting a pair of sprocket wheels 5 (one shown) which guide a pair of chains 7 (one shown) around the lower end of a continuous loop. Buckets 9 carried by the chains 7 scoop up bulk material as they rotate clockwise about the srpocket wheels 5, as viewed in FIG. 1, and discharge it at the upper end of the bucket ladder as disclosed in the patent.

Each sprocket wheel 5 is journaled for independent rotation about a shaft 11 by bearings 13. The shaft 11 in turn is mounted on the box frame 3 by bearings 15, and is rotated by a mechanism which includes a double-ended hydraulic actuator 17 mounted within the ladder box frame 3 by trunnion pin 155. A four-strand chain 19 connected to upper actuating rod 21 wraps around idler sprocket wheel 25 and four-strand sprocket drive wheel 23 mounted on shaft 11 and is then connected to lower actuating rod 21 forming a continuous loop. Rotation of shaft 11 is obtained by extending or retracting actuator rods 21.

The shaft 11 forms an elongated member which extends laterally out of the plane of the loop formed by one of the chains 7 of the bucket ladder. Secured to the extended end of the shaft 11 for rotation therewith is another elongated member in the form of an arm 27. Pivotally attached to the free end of the arm 27 is a screw conveyor 29 for dislodging bulk material and for drawing the bulk material toward the buckets 9 of the bucket ladder. The arm 27 is pivoted with a hub 31 fixed to the shaft 11. Extending generally radially outward from the hub 31 is a housing 33 which increases in cross section in the outward direction and terminates in a flange 35. A flanged cover 37 is bolted to the housing flange 35. The actuating rod 39 of a hydraulic cylinder 41, pivotally mounted in the arm 27, is rotatably connected to pin 43 (see FIG. 3), the ends of which are mounted to a pair of bellcranks 45, as shown in FIG. 5.

Rotation of the bellcranks 45 through extension and retraction of the actuating rod 39 of hydraulic actuator 41 pivots the screw conveyor with respect to the arms 27 in the following manner. The bellcranks 45 are secured to stub axles 47 by locking rings 49 inserted between the stub axles and rings 51 welded in bores in the bellcranks (see FIGS. 3 and 4). The stub axles 47 are mounted for rotation relative to the arms 27 by bushings 53 held in place by support rings 55 which are bolted to the arm housing 33 and cover 37 by bolts 57.

Figure 2:
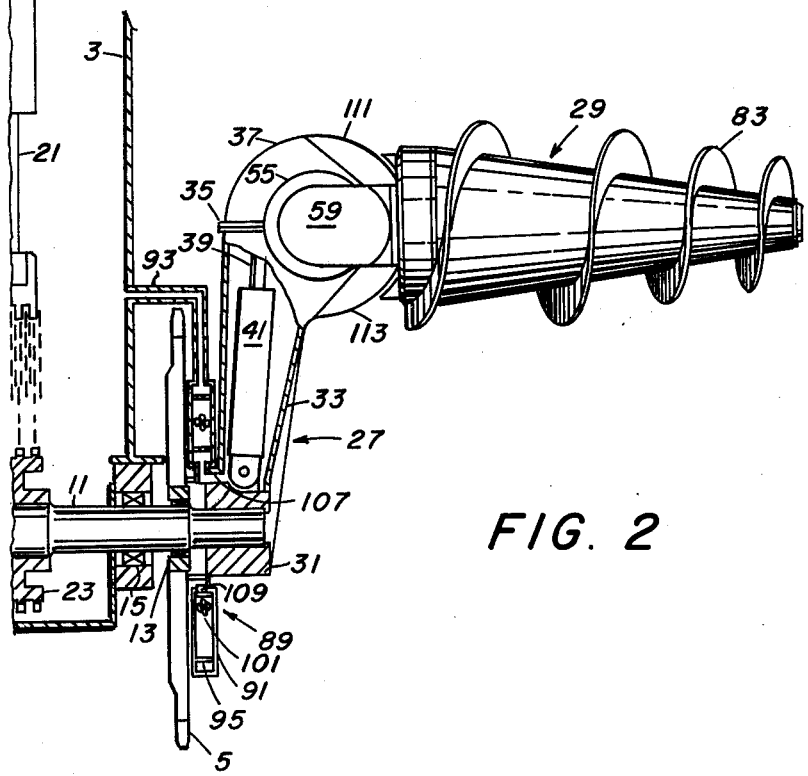
FIG. 2 is a partial front elevation view with some parts in section of the bucket ladder of FIG. 1 incorporating the invention.

Arms 59 are secured to the outwardly projecting ends of stub axles 47 for rotation therewith by keys 61. The free ends of the arms 59 are welded to a stepped annular support body 63. A rotating bearing housing 65 is mounted for rotation on the annular support body 63 by bearings 67 and 69. A motor 71 and gear reducer 73 are secured to the annular support body 63 by bolts 75. A coupling 77 connected to the gear reducer 73 rotates a drive plate 79 which in turn rotates the bearing housing 65 and the cone 81 of the screw conveyor, which carries the spiral flights 83 of the screw. The motor 71 is preferably a hydraulic motor but may also be an electric motor. As seen in FIG. 2, the pitch of the screw conveyor flights 83 increases from the outer extremity inward to accommodate for the additional material encountered by the screw conveyor as it is moved through the material transverse to its longitudinal axis by the forward and reverse movement of the transporter as discussed below.

In order to provide the hydraulic or electric service, depending upon the type of motor used to drive the screw conveyor, passages 85 are provided in the stub axles 47 and arms 59. Where, as shown in the illustrated embodiment of the invention, hydraulic motors are used, flexible couplings 87 are connected to the two stub axles 47 to provide a sealed rotatable connection for the hydraulic supply and return lines respectively.

Figure 6:
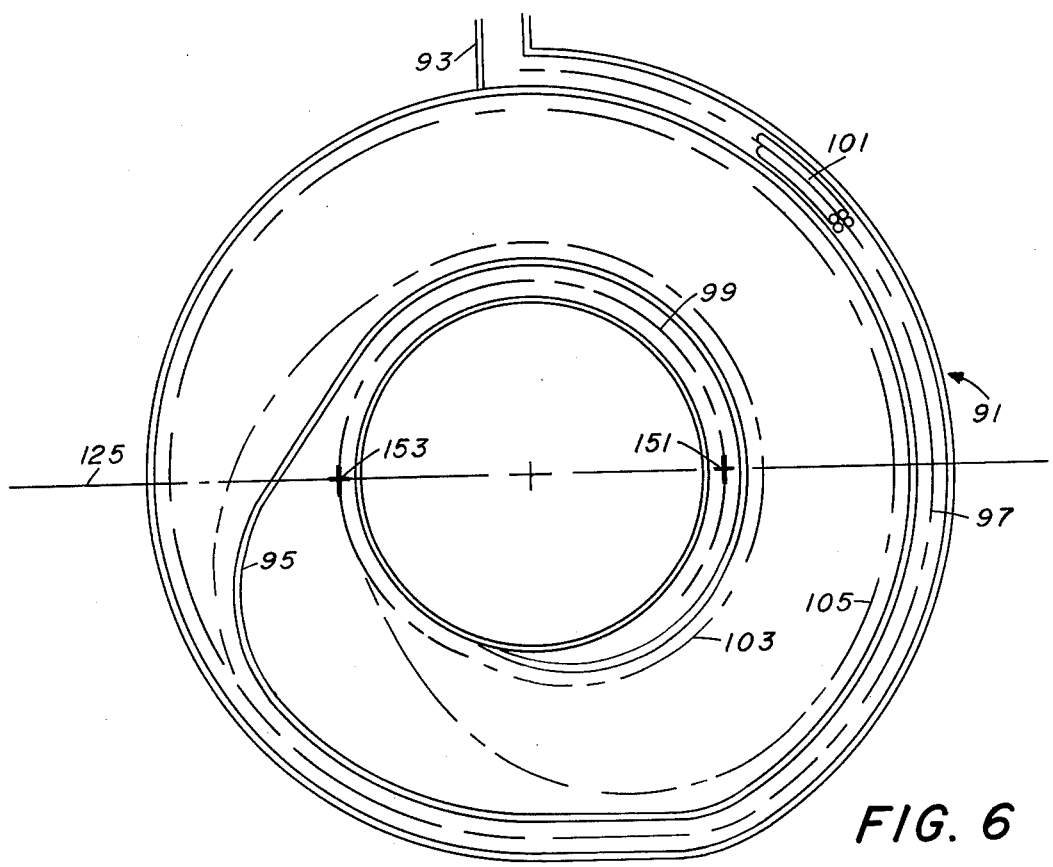
FIG. 6 is a vertical section view through the service line take-up device according to the invention.

The hydraulic lines for the screw conveyor motor which are led through the housing 33 of arm 27 and for the screw conveyor pivoting hydraulic cylinder 41 mounted inside the housing 33 are protected between the housing 33 and the box frame 3 of the bucket ladder by the take-up mechanism 89 which includes an annular housing 91 mounted concentrically with the shaft 11 outside the sprocket wheel 5. A conduit 93 extending over the top of the sprocket wheel 5 provides an enclosed passage between the outer periphery of the take-up mechanism housing 91 and the interior of the box frame. As illustrated in FIG. 6, a spiral partition 95 defines a narrow channel 97 extends about two-thirds of the distance around the periphery of the housing and then turns sharply toward the center of the housing where it defines another narrow channel 99 around approximately two-thirds of the interior of the housing. The bundle of service lines 101 are laid in the spiral track formed by the partition 95. When the arm 27 is rotated clockwise to position 151, as viewed in FIG. 6, the bundle of service lines 101 follows the contour indicated by the dash-dot line 103. When the arm 27 is rotated full counterclockwise to position 153, the bundle of service lines 101 follows the contour 105. As seen in FIG. 2, a sleeve 107 carried by the arm 27 projects through a groove extending around the annular inner wall of the housing 91 to guide the service bundle from the housing 91 into the arm 27. A slidable shield 109 connected to the sleeve 107 prevents bulk material and other foreign matter from entering the groove of the housing 91.

In order to prevent bulk material and other foreign material from getting inside the screw conveyor 29, a two piece shield is provided on arm 27, including an upper curved section 111 secured at its upper end to the arm cover 37 and a lower curved section 113. A bracket 115 is welded to the lower cover 113 and bolted to the upper section 111. A cooperating shield 117 with a matching curvature is provided on the screw conveyor 29 to prevent contamination of the motor and reducer cavity inside support body 63. Scrapers 119 prevent build up of foreign matter on curved sections 111 and 113.

Figure 7:
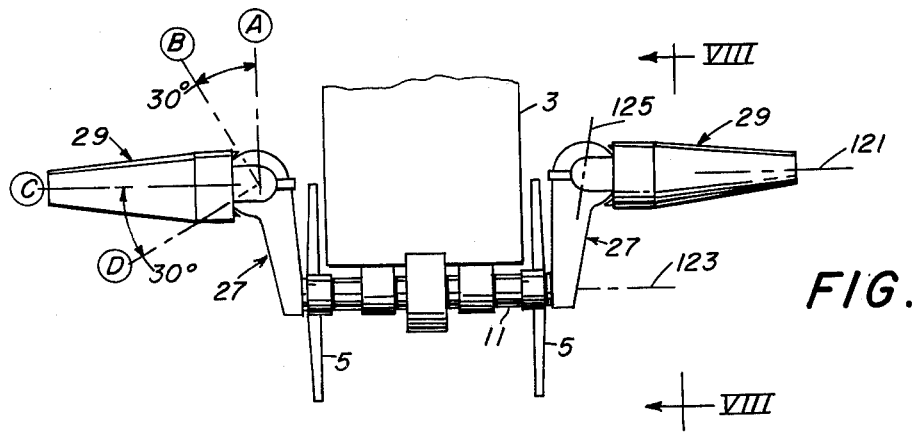
FIG. 7 is a schematic front view of a transporter incorporating the invention illustrating selected positions of the screw conveyor relative to its supporting arm.
Figure 8:
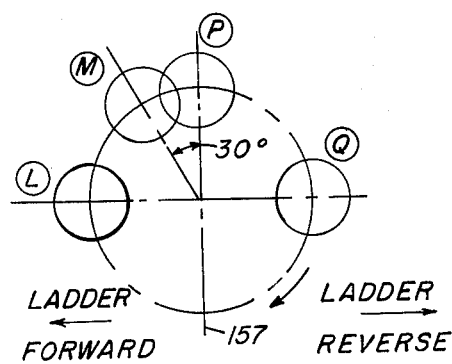
FIG. 8 is a schematic diagram illustrating selected positions of the screw conveyor supporting arm as viewed from the same side of the bucket ladder as FIG. 1.

As seen in the schematic diagram of FIG. 7, rotatable arms 27, each carrying a screw conveyor 29, are provided on both ends of the shaft 111 outside the respective sprocket wheels. FIGS. 7 and 8 together with Table I below illustrate the maneuverability of the dislodging screw apparatus constructed in accordance with the invention and particularly indicate preferred positions of the support arms 27 and the screw conveyor 29 for selected operations. In the examples given, the circled letters A through D illustrate the selected positions of the screw conveyors relative to the support arms. Although it is contemplated that in most operations both screw conveyors would be positioned alike, it is to be understood that in some operations it may be desirable to pivot the screw conveyors independently. The circled letters M, L, P and Q represent selected positions of the rotatable arms 27 and, as in the case of the screw conveyor, these positions are preferred but are in no way intended to limit the positions of either element. For the selected operations shown, the positioning of the support arms 27 and screw conveyors 29 is as follows:

TABLE 1

|  | Support Arm Position | Dislodging Screw Position | Direction Digging Arm Motion | Comment |
|---|---|---|---|---|
| Normal Digging Coal | Ⓜ | Ⓒ | Forward | ⓅSafety |
| Normal Digging Sinter | Ⓟ | Ⓐ | Forward | Screw Not Deployed |
| Normal Clean Up Coal & Sinter | Ⓛ | Ⓒ | Forward | ⒹSafety |
| Rear Corner Clear Up Coal & Sinter | Ⓠ | Ⓒ | Reverse | ⒹSafety |
| Parked | Ⓟ | Ⓐ | Any | Screw Not Deployed |
| Front | Ⓛ | Ⓑ | Sideways | ⒶSafety |

In addition to specifying the positions of the support arms and screw conveyors for the selected operations, Table I also indicates the direction that the depending bucket ladder 1 is moved. This movement is also indicated by the arrows labeled "LADDER FORWARD" and "LADDER REVERSE" shown in FIG. 8 which is a schematic diagram corresponding to the view shown in FIG. 1. As shown in the table and in FIGS. 7 and 8, for normal digging of coal the support arms 27 are inclined 30° forward of the centerline 157 of box frame 3 in the direction of ladder movement (position Ⓜ) with the screw conveyors 29 extending outward 90° to the side of the bucket ladder. Table I also illustrates that should the screw conveyors encounter resistance as they are advanced through the material in the ship's hold, the arm will be automatically moved toward the vertical position Ⓟ. At the same time, forward movement of the depending bucket ladder is terminated to prevent damage to the machine.

As also indicated in Table I, in the parked position the arm 27 is rotated to the position Ⓟ where it is in alignment with the loop formed by chains 7 of the bucket ladder and the screw conveyor is pivoted to the position Ⓐ where it is perpendicular to the shaft 11 and therefore parallel to the side of the bucket ladder. In this configuration, the device presents a slim profile for insertion through the hatch into a ship's hold. Once in the hold, the rotatable arm and screw conveyor can be repositioned for retrieving bulk material from under the ship's deck and from the corners of the hold. It can be appreciated from observing FIGS. 7 and 8 and Table I that throughout all the movement of the rotatable arms 27 and the screw conveyors 29 that the longitudinal axis 121 of the screw conveyors remain in a plane containing the longitudinal axes 123 and 125 of the shaft 11 and the arms 27 respectively.

It is evident from the above that the invention provides highly maneuverable and versatile apparatus for dislodging and drawing bulk material toward a vertical transporter. The apparatus is especially suitable for unloading bulk material through the hatch of a ship's hold since it has the facility to reach under the deck of the ship and into the corners of the hold to draw material toward the vertical transporter yet it easily fits through the hatch.

I claim as my invention:

1. Apparatus for dislodging and drawing bulk material toward a depending elongated bulk material transporter having lifting means which rotates in an elongated closed plane top to raise the bulk material from the lower end of the transporter to the upper end thereof, said apparatus comprising:

a first elongated member extending laterally out of the plane of said elongated loop formed by the lifting means near the lower end of the transporter, a second elongated member extending laterally from the extended end of said first elongated member and rotatable with respect to the loop formed by the lifting means about the longitudinal axis of the first elongated member, said second elongated member extending beyond the elongated closed loop formed by the lifting means except when said second elongated member is rotated toward the upper end of the transporter, elongated dislodging and gathering means for dislodging and drawing bulk material along a longitudinal axis thereof, and connecting means pivotally connecting one end of the elongated dislodging and gathering means to near the face end of the second elongated member for rotation of the dislodging and gathering means about said one end in a plane containing the longitudinal axis of said elongated dislodging and gathering means.

2. The apparatus of claim 1 wherein the elongated dislodging and gathering means is a screw conveyor.

3. The apparatus of claim 2 including means for mounting the first elongated member to the transporter with the longitudinal axis of the first elongated member transverse to the plane of the loop of said lifting means, means for mounting the second elongated member with the longitudinal axis thereof in a plane containing the longitudinal axis of the first longitudinal member and means for revolving said second elongated member about the longitudinal axis of the first elongated member, said screw conveyor being pivotable by said connecting means in the plane containing the longitudinal axes of the first and second elongated members and rotatable to a position wherein the longitudinal axis of the screw conveyor is perpendicular to the longitudinal axis of the first elongated member whereby in the latter position the conveyor may be stowed along side the lifting means by revolving the second elongated member into alignment with the loop of the lifting means.

4. The apparatus of claim 3 wherein the means for revolving the second elongated member includes means for rotating the first elongated member about its longitudinal axis and means for causing the second elongated member to revolve with said first elongated member.

5. The apparatus of claim 3 wherein said lifting means is a bucket ladder having a plurality of buckets connected at intervals to a continuous chain and including a sprocket wheel for guiding said chain about the lower end of said loop, and means for concentrically mounting said sprocket wheel and said first elongated member for independent rotation.

6. The apparatus of claim 5 wherein said lifting means includes a pair of continuous chains and a pair of sprocket wheels for guiding the respective chains around the lower end of the lifting means loop, and wherein the first elongated member extends laterally out of both sides of said loop and is concentrically mounted for independent rotation with each of said sprocket wheels, said apparatus including a pair of second elongated members extending laterally from each end of the first elongated member on either side of the transporter and a pair of screw conveyors each laterally extendable from one of said second elongated members whereby material can be dislodged and gathered toward said bucket ladder from both sides of the transporter.

* * * * *

UNITED STATES PATENT OFFICE
CERTIFICATE OF CORRECTION

PATENT NO. : 4,058,203
DATED : Nov. 15, 1977
INVENTOR(S) : Aubrey C. Briggs

It is certified that error appears in the above-identified patent and that said Letters Patent are hereby corrected as shown below:

In column 1, line 22, "3,823,915" should read --3,828,915--;

line 67, "gatering" should read --gathering--.

In column 2, line 20, "concentrally" should read --concentrically--.

In column 4, line 31, after "channel 97" insert --which--.

In column 5, in Table I, "Rear Corner Clear" should read --Rear Corner Clean--;

"Front" should read --Front Clean Up--.

In column 6, line 10, "top" should read --loop--;

line 44, "face" should read --free--.

Signed and Sealed this

Seventh Day of March 1978

[SEAL]

Attest:

RUTH C. MASON
*Attesting Officer*

LUTRELLE F. PARKER
*Acting Commissioner of Patents and Trademarks*